(12) United States Patent
Chung et al.

(10) Patent No.: US 6,336,368 B1
(45) Date of Patent: Jan. 8, 2002

(54) METHOD AND APPARATUS FOR ENERGY EFFICIENT TACKING OF RESONANT DEVICES

(75) Inventors: Russell Chung, Springfield; Robert Andrew McGill, Lorton, both of VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/404,720

(22) Filed: Sep. 10, 1999

(51) Int. Cl.[7] ................................................ G01L 1/00
(52) U.S. Cl. .............................. 73/774; 73/776; 73/579
(58) Field of Search ................................ 73/579, 32 A, 73/24.06, 24.01, 61.49, 774, 775, 776, DIG. 1

(56) References Cited

U.S. PATENT DOCUMENTS

| | | | |
|---|---|---|---|
| 4,361,026 A | * 11/1982 | Muller et al. | .................. 73/523 |
| 4,668,909 A | * 5/1987 | Hickernell et al. | ............ 324/56 |
| 4,895,017 A | * 1/1990 | Pyke et al. | ..................... 73/23 |
| 5,012,668 A | * 5/1991 | Hayworth | .................. 73/24.06 |
| 5,156,810 A | * 10/1992 | Ribi | ......................... 422/82.01 |
| 5,698,786 A | * 12/1997 | Andersen | ..................... 73/609 |

* cited by examiner

Primary Examiner—Richard A. Moller
(74) Attorney, Agent, or Firm—John J. Karasek; L. George Legg

(57) ABSTRACT

A method and apparatus for interrogating a resonator to monitor its resonance characteristics (e.g. resonant frequency) in an especially energy efficient manner, particularly changes to the characteristics over time. The resonator is pulsed and the response thereto sampled. By comparison of samples of the response to sequential pulses, sampled at the same times after pulse initiation, one can infer phase changes between the responses, and hence infer changes in resonance characteristics. Preferably, one calibrates the resonator's time response initially as a reference, which permits subsequent determination of the resonance state with only one digital sample per pulse.

In one embodiment, the invention this detection scheme is used as a chemical detector. The resonator is an electoacoustic device, having plural Bragg gratings, with a different adsorptive material atop each grating which adsorbs one selected chemical particularly well. Absorption causes the weight of material to increase, changing the resonance characteristics of the gratings. A single pulse launched into the SAW will cause reflections from each of the Bragg cells which are staggered in time, and hence separately detectable. The resonance of each grating is then tracked as above described, and changes thereto over time indicates the amount of material adsorbed.

26 Claims, 3 Drawing Sheets

METHOD AND APPARATUS FOR ENERGY EFFICIENT TACKING OF RESONANT DEVICES

BACKGROUND OF THE INVENTION

Detection systems whose operation is based on monitoring the change in frequency of an active circuit element have widespread applications, examples of which are frequency hoppers, phase locked loops, and annalyte sensors using surface acoustic wave devices (SAW devices). Phase locked loops and frequency hoppers must continually or quickly monitor the frequency of a circuit. SAW based annalyte sensors employ a SAW device in a stabilized loop oscillator, and have disposed on the SAW a polymer coating which is adsorptive of a chemical of interest. If such a chemical is present, the polymer absorbs it, thereby increasing the polymer's mass. The increased mass presses on the SAW, changing its acoustic properties, among which is its resonant frequency. By detecting frequency shift, one can infer the presence of, and concentration of, the chemical, and infer total exposure to the chemical.

For the last eighteen years of SAW chemical sensor development, the focus has been concerned around the development of a sensitive, reversible polymer coatings, rather than developing better detection circuits. With the maturity of the coating technology, SAW sensors found wide acceptance as early warning devices of the presence of harmful chemical agents for military and civilian personnel, and as chemical detection devices in law enforcement and elsewhere. These devices are attractive because of their small size, ruggedness, high sensitivity, and large dynamic range. However, current SAW sensors are based on continuously operated loop oscillators, in which the SAW device is the resonant element, which consume excessive amounts of power because of the DC bias required. Further, these circuits measure change in resonant state of the SAW element by taking a large number of digital samples of the SAW's output, and counting the number of zero crossings per unit time, or processing the samples in the frequency domain by use of a Fast Fourier Transform, which also consumes a great deal of power. This makes SAW based detection circuits undesirable for applications in which a user must carry the device on his person, because the high power consumption of loop oscillators would not permit operation for any appreciable length of time using ordinary batteries. Moreover, continuously operated loop oscillators can require frequent tuning to maintain circuit oscillation, and excessive loading as the polymer absorbs more chemical can cause the oscillation to cease entirely.

SUMMARY OF THE INVENTION

Accordingly, an object of the invention is to prevent mass loading or stiffening of the SAW detectors and the like from causing termination of circuit operation.

Another object is to reduce power consumption in systems using resonant elements sufficiently to permit such a circuit to be carried on one's person comfortably.

Another object is to do the foregoing in the time domain.

Another object is to reduce power consumption sufficiently to permit long term operation of such a circuit (i.e. days or weeks) using only simple and small batteries.

SUMMARY OF THE INVENTION

In accordance with these and other objects made apparent hereinafter, the invention concerns a system having a resonator, a pulse generator, and a detector, in which the detector receives the response of the resonator to at least one pulse from the pulse generator, produces one or more digital samples of the response, and from this determines, a parameter of the resonator determinative resonant frequency.

Because this does not rely on maintenance of circuit oscillation, mass loading of the resonator cannot interfere with system operation, and the system can detect much greater amounts of sorbed chemical.

Because interrogation is done by pulsed ringing of the resonator, rather than by maintenance of a continuous oscillation through the resonator, the amount of power uses is greatly reduced, such that one can reduce the size of a package containing the invention sufficiently to permit the package to be carried on one's person comfortably, and to operate sufficiently long (i.e. days or weeks) to permit using only simple and small batteries as a power source.

Because detection is done in the time domain, rather than in the frequency domain, one does not have to use Fast Fourier transforms or frequency counting schemes, which require a large number of samples to operate properly, and hence consume a great deal of power in so doing.

These and other objects are further understood from the following detailed description of particular embodiments of the invention. It is understood, however, that the invention is capable of extended application beyond the precise details of these embodiments. Changes and modifications can be made to the embodiments that do not affect the spirit of the invention, nor exceed its scope, as expressed in the appended claims. The embodiments are described with particular reference to the accompanying drawings, wherein:

DETAILED DESCRIPTION

Figure 1:
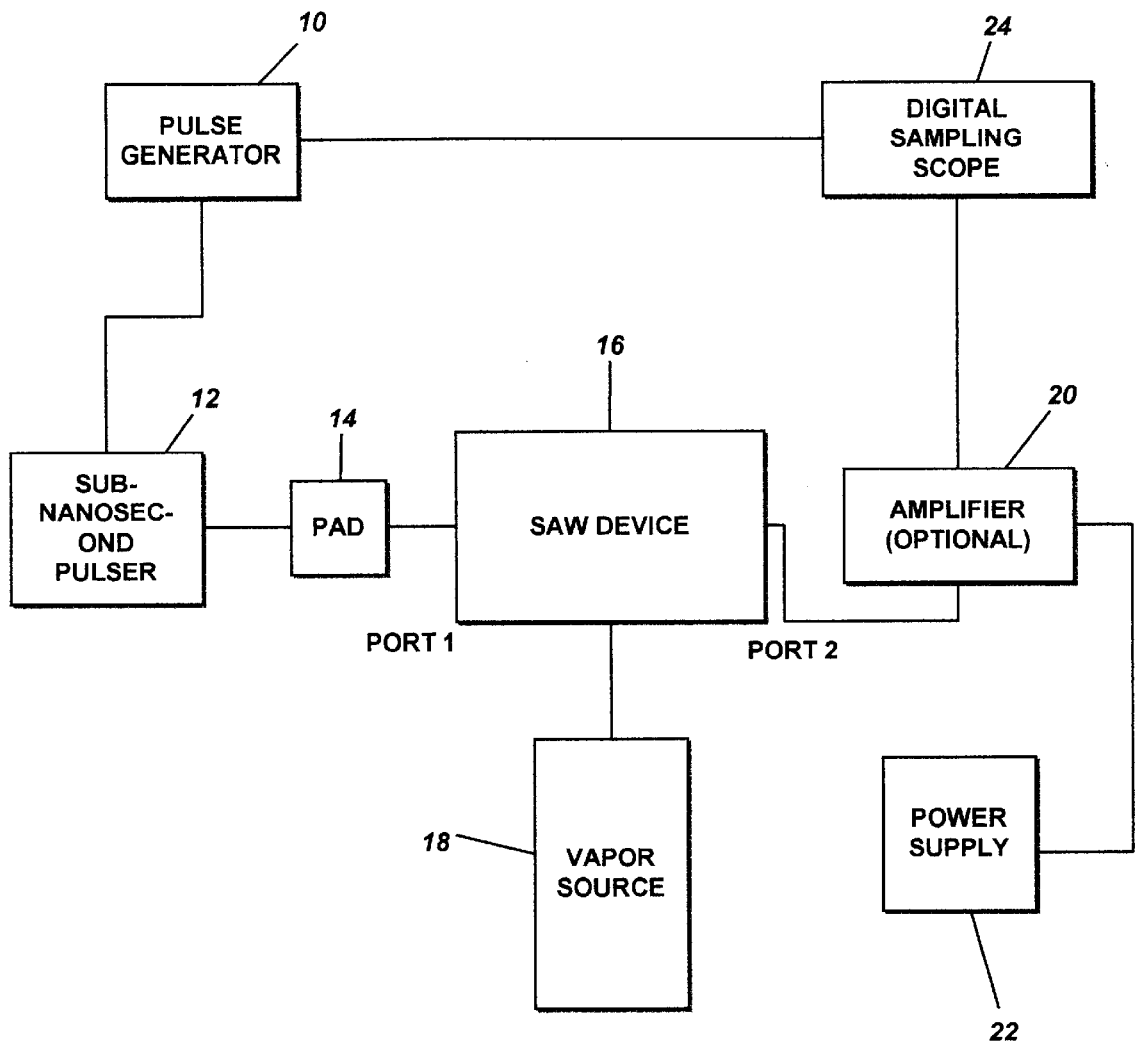
FIG. 1 is a schematic view of a system incorporating the invention.

With reference to the drawing figures, wherein like numbers indicate like parts throughout the several views, FIG. 1 shows schematic of an embodiment according to the invention. Pulse generator 10 triggers pulsing element 12, and simultaneously informs detector 24 that a pulse has issued. The pulse enters (input port 1) of resonant element 16, here a SAW device, via pad 14, which isolates pulser 12 and device 16 from destructive signal reflections. Pad 14 is optimally a circulator, but can be a simple resistive element. In device 16, the input pulse is transduced to a corresponding acoustic signal which traverses device 16 and exits (via output port 2) to optional amplifier 20, 22, and ultimately reaches detector 24, which contains an analog to digital converter to sample SAW device 16's output. Detector 24 can be any conventional device for sampling and analyzing data, most preferably a digital process computer coupled with a conventional analog to digital converter.

Figure 2:
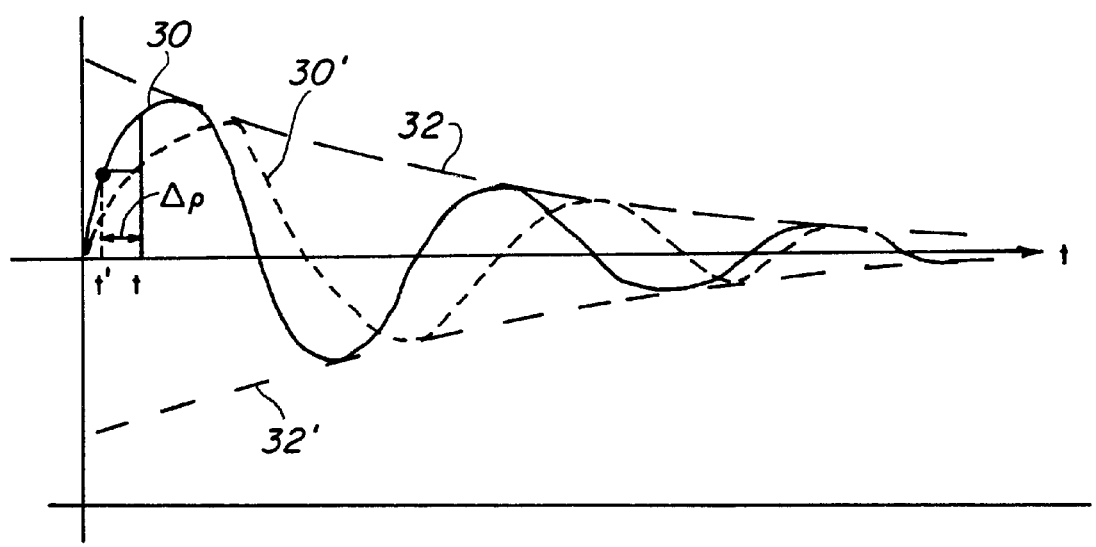
FIG. 2 is a graph illustrating response of the system of FIG. 1.

With reference to FIG. 2, the temporal output 30 of SAW device is that of a rung circuit, a damped sinusoid, generally of the form $e^{(-t/a)} \sin(\omega t)$, where t is time, "a" is proportional to circuit quality factor, a measure of circuit dissipation, and ω is the (angular) frequency of output. (The quality factor q is a$\omega$, or, stated alternatively, "a" is the circuit quality factor normalized to $\omega$.) In effect, this is a sinusoid disposed within an envelope of $e^{(-t/a)}$ (32) and $e^{(+t/a)}$ (32'). As the resonance characteristics of SAW device 16 change, frequency $\omega$ changes correspondingly, resulting in an output 30' of different phase from output 30. One can measure this by sampling output 30' at a preselected time t. From an a priori knowledge of the circuit's unloaded response 30, e.g. through initial circuit calibration, detector 24 determines the time t' at which the unloaded and loaded responses were equal, and the corresponding phase difference $\Delta\phi$ between them, which uniquely determines the change in resonance characteristics of device 16 between the times responses 30 and 30' were generated, and in particular uniquely defines the change in resonant frequency between these times. In this manner, one can determine the resonance characteristics of member 16 using one digital sample only. Detector 30 can similarly determine the quality factor "a" of signal 30' by comparing the amplitude of response 30' at time t to an a priori knowledge of response 30. One can also improve the signal to noise ratio of the overall system by pulsing device 16 several times, determining its resonance response (e.g. determine $\Delta\phi$) each time, and then averaging them. This effective forms a coherent sum of the response of device 16, and is especially important for reducing circuit jitter.

In addition to having a bandwidth comprehending that of all the Bragg gratings, one can further improve the energy budget of the overall system by tailoring pulses from 12 to be formed predominantly or entirely from a spectral line in each of the Bragg gratings, preferably the center frequency of each.

Figure 3:
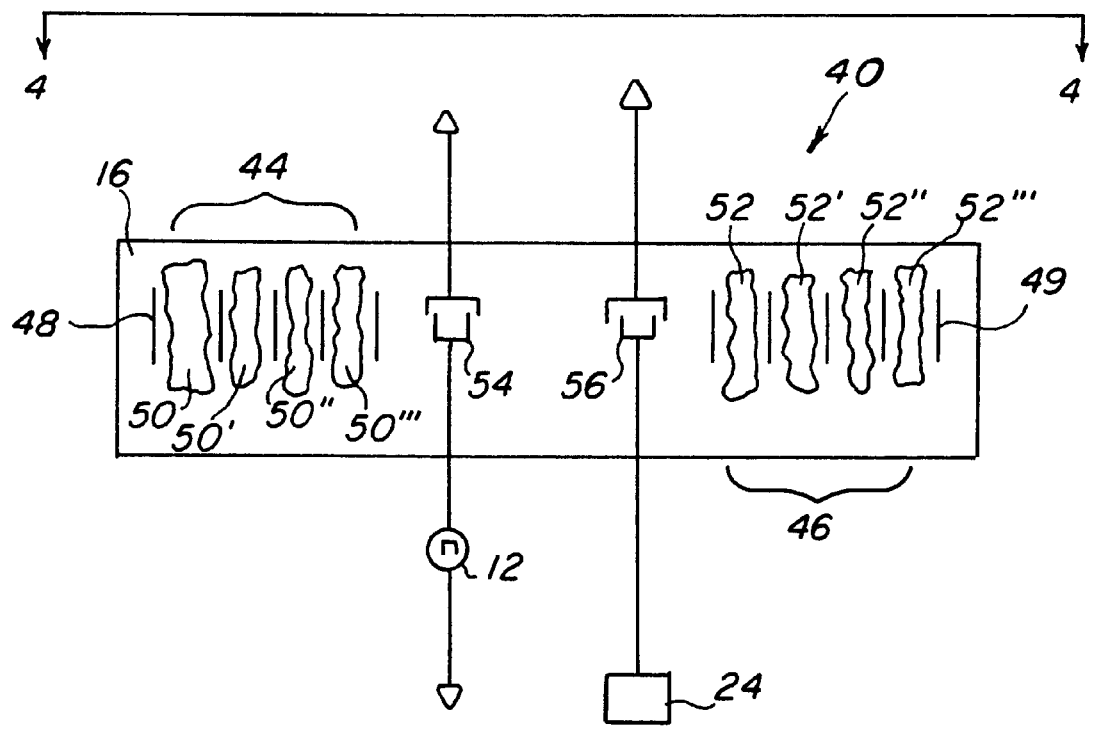
FIG. 3 is a schematic of an embodiment of the invention, viewed in the direction of lines 3—3 of FIG. 4.
Figure 4:
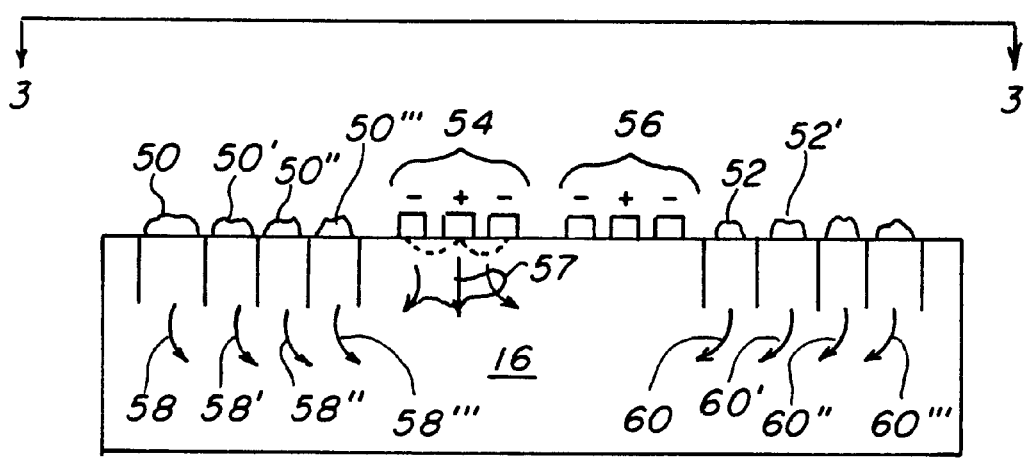
FIG. 4 is a schematic view in the direction of lines 4—4 of FIG. 3.

FIGS. 3 and 4 are respective top and side views of a device for detecting the presence of multiple chemical species. Saw device 16 has formed in it two groups 44, 46 of four Bragg gratings each, each grating having a reflective bandwidth separate from the other gratings. (The boundary between gratings is illustrated by lines 48, 49.) Disposed atop the Bragg gratings are coatings 50, 50', 50", 50''', 52, 52', 52" and 52''' (below collectively referred to as coatings 50, 52), each of which is selected to adsorb a different chemical of interest. Input line 54 delivers a pulse from member 12, which in a known manner launches an acoustic signal 57 in the form of a wavefront propagating through SAW 16. The pulse is selected to have a bandwidth spanning the bandwidths of all the Bragg gratings, which causes each grating to reflect a portion of acoustic signal 57, returning a plurality of acoustic signals 58, 58', 58", 58''', 60, 60', 60", 60''', which output 56 receives and transduces into a corresponding electrical signal which is returned to detector 24 for processing. Because each Bragg grating is a different distance from input 54, the reelections from each Bragg grating will be separated from one another in time, they are in effect time division multiplexed, permitting detector 24 to process them separately, applying the procedure discussed above in conjunction with FIG. 2 to each signal returned from each Bragg grating. In this manner, detector 24 determines the change in resonance for the portion of SAW 16 directly beneath each of the adsorptive coatings 50, 52, and thus permits determining of the amount of chemical absorbed by each of the coatings.

Resonant device 16 could be any appropriate electro-acoustic device, for example thin film resonators, flexural plate wave devices, etc. There are a wide range of appropriate electro-acoustic materials which could be used to form devices such as are illustrated in FIGS. 3–4, but is preferably quartz because it can be made single crystal, and hence minimizes internal scattering, and is relatively temperature stable. Coatings 50, 52 are most preferably either bioselective or chemoselective. By bioselective, it is meant that either the chemical annalyte, the coating, or both, absorb by forming bonds based on primary, secondary, or tertiary protein structure, processes known to those in the biodetector art as bonding by the formation of higher orders of structure. By chemoselective it is meant absorption based on simpler chemical bonding, and for instant purposes encompasses any bonding that is not by definition chemoselective.

The invention has been described in what is considered to be the most practical and preferred embodiments. It is recognized, however, that obvious modifications to these embodiments may occur to those with skill in this art. Accordingly, the scope of the invention is to be discerned from reference to the appended claims, wherein:

What is claimed is:

1. A system comprising:
   a resonator;
   a detector;
   wherein said detector is operatively disposed to receive the response of said resonator to at least, one pulse from said pulse generator;
   wherein said detector comprises an analog to digital converter operatively disposed to produce one or more digital samples of said response; and
   wherein said detector is adapted effective to determine, responsive to said one or more digital samples, a parameter of said resonator determinative of the resonant frequency of said resonator;
   whereby said resonant frequency is thereby determined by pulse excitation of said resonant device without having to provide a sustained signal driving said resonator to measure said parameter and determine said resonant frequency.

2. The system of claim 1, wherein said resonator comprises an absorber of a preselected chemical, and said detector is adapted effective to determine the change in said parameter responsive to absorption of said chemical by said absorber.

3. The system of claim 2, wherein said absorber is a chemoselective material.

4. The system of claim 2, wherein the absorber is a bioselective material.

5. The system of claim 1, wherein said one or more digital samples is at least two digital samples collected in a preselected time span, and said detector is adapted to use said at least two digital samles to determine a quality factor of said response.

6. The system of claim 1, wherein said detector is adapted to use said parameter and said at least one of said digital samples to determine a quality factor of said response.

7. The system of claim 1, wherein said one or more digital samples is one digital sample.

8. The system of claim 4, wherein said resonator is a SAW device.

9. The system of claim 8, wherein said resonator is a SAW device.

10. The system of claim 9, wherein
    said response is reflections from each of said at least two Bragg gratings;
    said detector is operatively disposed to separately receive a plurality of reflections, one each of said plurality of reflections corresponding to a respective one of said at least two Bragg gratings; and
    said detector is adapted, responsive to said plurality of reflections, to determine the resonant frequency of said each of said at least two Bragg gratings.

11. The system of claim 10, wherein said at least one pulse has a bandwidth containing the bandwidth of each of said at least two Bragg gratings.

12. The system of claim 10, wherein the spectral content of said at least one pulse is tailored to contain the center frequency of each of said at least two Bragg gratings.

13. The system of claim 1, wherein:

said at least one pulse is two or more pulses;

said detector is adapted to determine, responsive to the respective responses of said resonator to said two or more pulses; a corresponding two or more measurements of said parameter; and said detector is adapted to form a coherent sum of said two or more measurements.

14. A method comprising the steps of:

pulsing a resonator with at least one pulse;

detecting the response of said resonator to said at least one pulse;

producing one or more digital samples of said response; and determining, responsive to said one or more digital samples, a parameter of said resonator determinative of the resonant frequency of said resonator without having to provide a sustained signal driving said resonator.

15. The method of claim 14, wherein:

exposing said resonator to a preselected chemical;

permitting said resonator to absorb said chemical; and determining the change in said parameter responsive to absorption of said chemical by said resonator.

16. The method of claim 15, comprising:

disposing a chemoselective material effective to perform said permitting.

17. The method of claim 15, comprising:

disposing a bioselective material effective to perform said permitting.

18. The method of claim 14, wherein said one or more digital samples is at least two digital samples, said method further comprising:

using said at least two digital samples to determine the quality factor of said response.

19. The method of claim 14, further comprising using said parameter and said at least one of said digital samples to determine the quality factor of said response.

20. The method of claim 14, wherein said one or more digital samples is one digital sample.

21. The method of claim 17, further comprising employing a SAW device as said resonator.

22. The method of claim 21, comprising selecting said SAW device to have at least two gratings.

23. The method of claim 22, wherein said response is reflections from each of said at least two Bragg gratings; further comprising:

responsive to said at least one pulse, receiving a plurality of reflections, one each of said plurality of reflections corresponding to a respective one of said at least two Bragg gratings; and determining the resonant frequency of said each of said at least two Bragg gratings.

24. The method of claim 23, wherein said at least one pulse has a bandwidth containing the bandwidth of each of said at least two Bragg gratings.

25. The method of claim 23, wherein the spectral content of said at least one pulse is tailored to contain the center frequency of each of said at least tow Bragg gratings.

26. The method of claim 14, wherein:

said at least one pulse is two or more pulses;

determining, responsive to a respective responses of said resonator to each of said two or more pulses, a corresponding two or more measurements of said parameter; and forming a coherent sum of said two or more measurements.

* * * * *